(12) United States Patent
Takato

(10) Patent No.: US 11,676,396 B2
(45) Date of Patent: Jun. 13, 2023

(54) AUTOMATED VALET PARKING SYSTEM AND SERVICE PROVIDING METHOD

(71) Applicant: Toyota Jidosha Kabushiki Kaisha, Toyota Aichi-ken (JP)

(72) Inventor: Miyuki Takato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 406 days.

(21) Appl. No.: 17/120,898

(22) Filed: Dec. 14, 2020

(65) Prior Publication Data
US 2021/0248386 A1 Aug. 12, 2021

(30) Foreign Application Priority Data
Feb. 12, 2020 (JP) .............................. JP2020-021798

(51) Int. Cl.
*G06V 20/56* (2022.01)
*G06T 7/00* (2017.01)
(Continued)

(52) U.S. Cl.
CPC ............ *G06V 20/56* (2022.01); *G06Q 10/20* (2013.01); *G06T 7/0002* (2013.01); *G06V 20/54* (2022.01); *G08G 1/017* (2013.01); *G06V 2201/08* (2022.01)

(58) Field of Classification Search
CPC .... G06V 20/56; G06V 20/54; G06V 2201/08; G06V 20/586; G06Q 10/20; G06T 7/0002; G08G 1/017; G08G 1/146; G08G 1/0175; G08G 1/0969; G08G 1/148; G01S 17/931; G01S 2013/9314; G01S 2015/932
(Continued)

(56) References Cited

U.S. PATENT DOCUMENTS 8,130,120 B2 * 3/2012 Kawabata ............ B62D 15/028
340/908
10,251,128 B2 * 4/2019 Nguyen .................. H04L 51/18
(Continued)

FOREIGN PATENT DOCUMENTS

CN 107054357 A * 8/2017 ............. B60K 35/00
CN 110027569 A * 7/2019 ......... G01C 21/3438
(Continued)

*Primary Examiner* — Mahendra R Patel
(74) *Attorney, Agent, or Firm* — Dinsmore & Shohl LLP

(57) ABSTRACT

An automated valet parking system provides an automated valet parking service in a parking lot. Recognition result information is generated based on a result of recognition by a recognition sensor when a vehicle exists in the parking lot. The automated valet parking system identifies the vehicle position in the parking lot by using an infrastructure sensor installed in the parking lot. The automated valet parking system acquires expected recognition result information expected to be obtained at the vehicle position. Then, the automated valet parking system compares the recognition result information with the expected recognition result information to calculate reliability of the recognition result information based on a difference between them. When the reliability is lower than a threshold, the automated valet parking system transmits notification information for notifying an abnormality of the recognition sensor to a terminal device operated by a user of the vehicle.

8 Claims, 9 Drawing Sheets

(51) Int. Cl.
  *G06Q 10/20* (2023.01)
  *G08G 1/017* (2006.01)
  *G06V 20/54* (2022.01)

(58) Field of Classification Search
  USPC .......................................................... 382/104
  See application file for complete search history.

(56) References Cited

U.S. PATENT DOCUMENTS

| | | | | |
|---|---|---|---|---|
| 2015/0336587 | A1* | 11/2015 | Inoue | B60W 30/045 |
| | | | | 701/1 |
| 2015/0353080 | A1* | 12/2015 | Mukaiyama | E05B 77/54 |
| | | | | 701/23 |
| 2016/0196702 | A1* | 7/2016 | Wilson | G07B 15/02 |
| | | | | 340/5.7 |
| 2017/0203757 | A1* | 7/2017 | Ohbayashi | B60W 10/20 |
| 2017/0323565 | A1* | 11/2017 | Nordbruch | G08G 1/096725 |
| 2018/0105165 | A1* | 4/2018 | Alarcon | B60W 50/029 |
| 2019/0061818 | A1* | 2/2019 | Hiei | F16H 63/40 |
| 2019/0283736 | A1 | 9/2019 | Watanabe | |
| 2019/0285726 | A1 | 9/2019 | Muto | |

FOREIGN PATENT DOCUMENTS

| | | | | | |
|---|---|---|---|---|---|
| ES | 2735284 | A1 * | 12/2019 | ......... | G01C 21/3438 |
| JP | 2004110625 | A * | 4/2004 | ........... | B62D 15/027 |
| JP | 2018500668 | A | 1/2018 | | |
| JP | 6342076 | B2 | 6/2018 | | |
| JP | 2019160086 | A | 9/2019 | | |
| WO | WO-2014162753 | A1 * | 10/2014 | ........... | B62D 15/027 |
| WO | WO-2014196040 | A1 * | 12/2014 | ........... | B60W 30/06 |
| WO | 2018079297 | A1 | 5/2018 | | |

\* cited by examiner

AUTOMATED VALET PARKING SYSTEM AND SERVICE PROVIDING METHOD

CROSS-REFERENCE TO RELATED APPLICATION

This application claims priority to Japanese Patent Application No. 2020-021798 filed on Feb. 12, 2020, the entire contents of which are herein incorporated by reference.

BACKGROUND

Technical Field

The present disclosure relates to a technique for providing an automated valet parking (AVP) service in a parking lot.

Background Art

Patent Literature 1 discloses a technique related to an automated valet parking service in a parking lot, that is, providing additional services such as cleaning, refueling, inspection, repair, and tire change to a vehicle parked in the parking lot.

LIST OF RELATED ART

Patent Literature 1: Japanese Patent No. 6342076

SUMMARY

An automated valet parking service in a parking lot is known. A vehicle supporting the automated valet parking service includes a recognition sensor that recognizes a situation around the vehicle. By using such the recognition sensor, the vehicle is able to autonomously travel in the parking lot. That is, using the recognition sensor enables vehicle travel control for the automated valet parking. The recognition sensor may be used for vehicle travel control outside the parking lot. In any case, an abnormality of the recognition sensor (e.g., dirt, axis misalignment) leads to decrease in recognition accuracy, which in turn leads to decrease in accuracy of the vehicle travel control.

An object of the present disclosure to provide a technique that can detect an abnormality of a recognition sensor of a vehicle supporting an automated valet parking service.

A first aspect is directed to an automated valet parking system that provides an automated valet parking service in a parking lot. A vehicle supporting the automated valet parking service includes a recognition sensor that recognizes a situation around the vehicle. The automated valet parking system includes: one or more processors; and one or more memories configured to store recognition result information generated based on a result of recognition by the recognition sensor when the vehicle exists in the parking lot. The one or more processors are configured to: identify a vehicle position being a position of the vehicle in the parking lot, based on a result of recognition by an infrastructure sensor installed in the parking lot; acquire expected recognition result information that is the recognition result information expected to be obtained at the vehicle position; compare the recognition result information with the expected recognition result information to calculate reliability of the recognition result information based on a difference between the recognition result information and the expected recognition result information; and when the reliability is lower than a threshold, transmit notification information for notifying an abnormality of the recognition sensor to a terminal device operated by a user of the vehicle.

A second aspect further has the following feature in addition to the first aspect. The automated valet parking service includes an additional service that performs at least one of car wash, inspection, and repair during a period in which the vehicle is left in the parking lot. The notification information includes additional service information that proposes to perform the additional service.

A third aspect further has the following feature in addition to the first or second aspect. The recognition result information indicates the vehicle position estimated based on the result of recognition by the recognition sensor. The one or more processors acquire, as the expected recognition result information, information indicating the vehicle position identified based on the result of recognition by the infrastructure sensor.

A fourth aspect further has the following feature in addition to the third aspect. The one or more processors calculate the reliability to be lower as a difference between the vehicle position indicated by the recognition result information and the vehicle position indicated by the expected recognition result information becomes larger.

A fifth aspect further has the following feature in addition to the first or second aspect. A mark is placed at a predetermined position in the parking lot. The recognition result information indicates a position of the mark calculated based on the result of recognition by the recognition sensor. The one or more memories further store parking lot map information indicating an arrangement of marks in the parking lot. The one or more processors identify, based on the parking lot map information, the mark expected to be recognized by the recognition sensor of the vehicle existing at the vehicle position and acquire information indicating the predetermined position of the identified mark as the expected recognition result information.

A sixth aspect further has the following feature in addition to the fifth aspect. The one or more processors calculate the reliability to be lower as a difference between the calculated position of the mark indicated by the recognition result information and the predetermined position of the identified mark indicated by the expected recognition result information becomes larger.

A seventh aspect is directed to a service providing method that provides an automated valet parking service in a parking lot. A vehicle supporting the automated valet parking service includes a recognition sensor that recognizes a situation around the vehicle. The service providing method includes: acquiring recognition result information generated based on a result of recognition by the recognition sensor when the vehicle exists in the parking lot, identifying a vehicle position being a position of the vehicle in the parking lot, based on a result of recognition by an infrastructure sensor installed in the parking lot; acquiring expected recognition result information that is the recognition result information expected to be obtained at the vehicle position; comparing the recognition result information with the expected recognition result information to calculate reliability of the recognition result information based on a difference between the recognition result information and the expected recognition result information; and when the reliability is lower than a threshold, transmitting notification information for notifying an abnormality of the recognition sensor to a terminal device operated by a user of the vehicle.

An eighth aspect further has the following feature in addition to the seventh aspect. The automated valet parking service includes an additional service that performs at least one of car wash, inspection, and repair during a period in which the vehicle is left in the parking lot. The notification information includes additional service information that proposes to perform the additional service.

According to the first and seventh aspects, it is possible to detect an abnormality of the recognition sensor of the vehicle supporting the automated valet parking service. More specifically, the recognition result information generated based on the result of recognition by the recognition sensor when the vehicle exists in the parking lot is acquired. Meanwhile, by using the infrastructure sensor installed in the parking lot, the vehicle position in the parking lot is identified and the expected recognition result information expected to be obtained at the vehicle position is acquired. Ideally, the recognition result information and the expected recognition result information are consistent with each other. However, if an abnormality of the recognition sensor occurs, accuracy of the recognition result information decreases, and thus the recognition result information deviates from the expected recognition result information. Therefore, comparing the recognition result information with the expected recognition result information makes it possible to detect the abnormality of the recognition sensor.

When the abnormality of the recognition sensor of the vehicle is detected, the notification information for notifying the abnormality of the recognition sensor is transmitted to the terminal device. The user of the vehicle is able to know the abnormality of the recognition sensor through the notification information. Such the information providing service is performed as a part of the automated valet parking service and contributes to increase in convenience and usefulness of the automated valet parking service.

According to the second and eighth aspects, the automated valet parking service includes the additional service that performs at least one of car washing, inspection, and repair. The notification information includes the additional service information that proposes to perform the additional service. As a result, increase in opportunity of usage of the additional service is expected. This is preferable for a service provider. Moreover, when the additional service is used, the convenience and the usefulness of the automated valet parking service are further increased.

DETAILED DESCRIPTION

Embodiments of the present disclosure will be described with reference to the accompanying drawings.

1. Outline of Automated Valet Parking System

Figure 1:
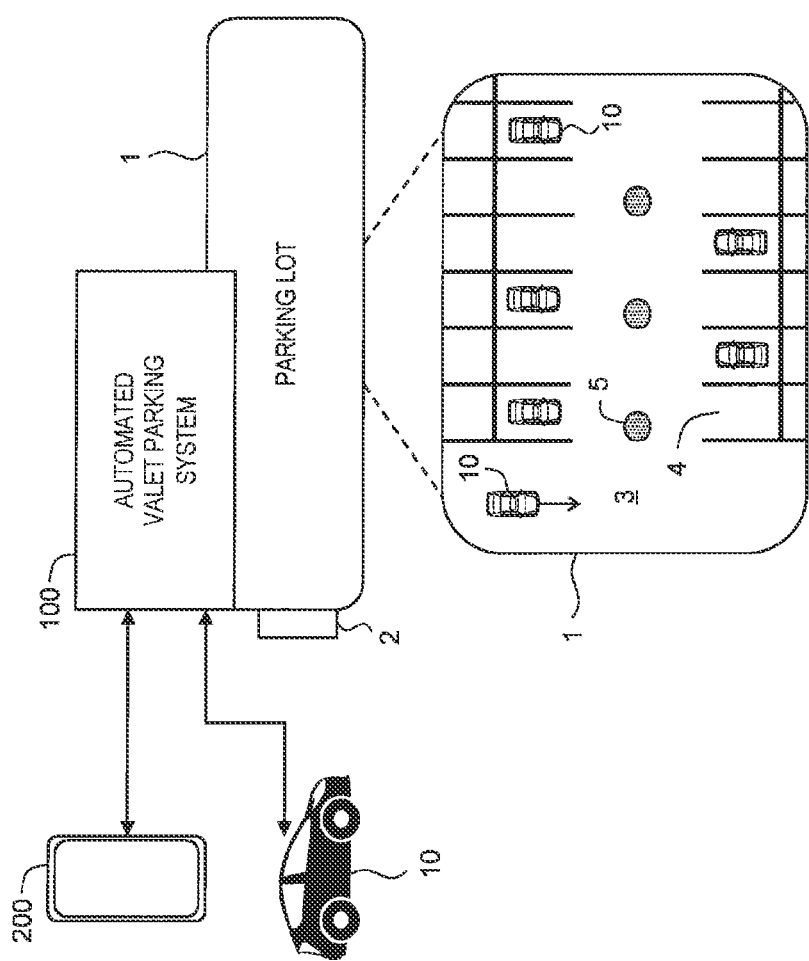
FIG. 1 is a conceptual diagram for explaining an outline of an automated valet parking system according to an embodiment of the present disclosure.

FIG. 1 is a conceptual diagram for explaining an outline of an automated valet parking system 100 according to the present embodiment. The automated valet parking system 100 manages and provides an automated valet parking (AVP) service in a parking lot 1.

A vehicle supporting the automated valet parking service is hereinafter referred to as an "AVP vehicle 10." The AVP vehicle 10 is able to communicate with the automated valet parking system 100. Moreover, the AVP vehicle 10 is able to travel without a driving operation by a driver at least in the parking lot 1. The AVP vehicle 10 may be an automated driving vehicle.

The parking lot 1 is used at least by AVP vehicles 10. The parking lot 1 may be used by general vehicles other than the AVP vehicles 10.

The parking lot 1 includes a pick-up and drop-off area 2, a passage 3, and a plurality of parking spaces 4. The AVP vehicle 10 to enter the parking lot 1 or the AVP vehicle 10 that exits the parking lot 1 is stopped at the pick-up and drop-off area 2. At the pick-up and drop-off area 2, an occupant gets off the AVP vehicle 10 and gets on the AVP vehicle 10. The passage 3 is an area where vehicles such as the AVP vehicles 10 and the general vehicles travel. The parking space 4 is a space in which the vehicle such as the AVP vehicle 10 and the general vehicle is parked. For example, the parking space 4 is partitioned by mark lines.

A mark 5 (landmark) may be placed at a predetermined position in the parking lot 1. The mark 5 is used for guiding the AVP vehicle 10 in the parking lot 1. Examples of the mark 5 include a marker, a pillar, and the like. Typically, a plurality of marks 5 are arranged in a distributed manner in the parking lot 1.

Hereinafter, an example of a flow when a user X uses the automated valet parking service will be described. It is assumed that member information of the user X is registered in advance in the automated valet parking system 100. A vehicle license number (i.e., a number on a license plate) of the AVP vehicle 10 used by the user X may also be registered in advance in the automated valet parking system 100 along with the membership information of the user X.

A terminal device 200 is a terminal device operated by the user X. Typically, the terminal device 200 is owned by the user X. Examples of the terminal device 200 include a smartphone, a tablet, a personal computer, an HMI (Human-Machine Interface) mounted on the AVP vehicle 10, and the like. The terminal device 200 is able to communicate with the automated valet parking system 100.

First, the user X makes a reservation of the automated valet parking. For example, the user X operates the terminal device 200 to input ID information of the user X, a desired parking lot 1, a desired date of use, a desired time of use (i.e., a desired entry time and a desired exit time), and the like. The user X may further input the vehicle license number of the AVP vehicle 10. The terminal device 200 sends reservation information including the input information to the automated valet parking system 100. The automated valet parking system 100 executes reservation processing based on the reservation information, and sends a reservation completion notification to the terminal device 200. In addition, the automated valet parking system 100 sends authentication information associated with the reservation information to the terminal device 200. The terminal device 200 receives the authentication information and holds the received authentication information.

Entry of the AVP vehicle 10 into the parking lot 1 is as follows. The AVP vehicle 10 with the user X arrives and stops at the pick-up and drop-off area 2 of the parking lot 1. At the pick-up and drop-off area 2, the user X (and other occupants if any) gets off the AVP vehicle 10. Then, the user X requests the entry of the AVP vehicle 10 by using the authentication information held in the terminal device 200. For example, the user X sends the authentication information from the terminal device 200 to the automated valet parking system 100. Alternatively, the user X may make a reader installed in the pick-up and drop-off area 2 read the authentication information (e.g., a QR code (registered trademark)).

In response to the entry request, the automated valet parking system 100 conducts authentication of the user X. For example, the automated valet parking system 100 authenticates the user X by checking the authentication information against the reservation information. In addition, the automated valet parking system 100 may read the vehicle license number on the license plate of the AVP vehicle 10 by using a camera installed in the pick-up and drop-off area 2. Then, the automated valet parking system 100 may authenticate the AVP vehicle 10 by checking the read vehicle license number against the vehicle license number that is registered in advance or included in the reservation information.

Upon completion of the authentication, authority to operate the AVP vehicle 10 is transferred from the user X to the automated valet parking system 100. The automated valet parking system 100 executes entry processing with regard to the AVP vehicle 10.

In the entry processing, the automated valet parking system 100 communicates with the AVP vehicle 10 to activate the AVP vehicle 10 (ignition ON).

Further, the automated valet parking system 100 refers to a utilization status of the parking lot 1 to allocate an available parking space 4 to the AVP vehicle 10. Then, the automated valet parking system 100 communicates with the AVP vehicle 10 to provide the AVP vehicle 10 with entry guiding information. The entry guiding information includes information of the allocated parking space 4 and map information of the parking lot 1. The automated valet parking system 100 may specify a travel route from the pick-up and drop-off area 2 to the allocated parking space 4. In that case, the entry guiding information includes information of the specified travel route.

After that, the automated valet parking system 100 communicates with the AVP vehicle 10 to permit the entry.

Upon receipt of the entry permit, the AVP vehicle 10 initiates vehicle travel control. More specifically, based on the entry guiding information, the AVP vehicle 10 automatically travels on the passage 3 from the pick-up and drop-off area 2 to the allocated parking space 4 and automatically parks in the allocated parking space 4. At this time, the AVP vehicle 10 may travel along the travel route specified by the automated valet parking system 100. The automated valet parking system 100 may communicate with the AVP vehicle 10 to remotely control the travel of the AVP vehicle 10.

Upon completion of the parking, the AVP vehicle 10 notifies the automated valet parking system 100 of the parking completion. Alternatively, the automated valet parking system 100 may use an infrastructure sensor installed in the parking lot 1 to detect completion of the parking of the AVP vehicle 10. After the parking is completed, the automated valet parking system 100 communicates with the AVP vehicle 10 to deactivate the AVP vehicle 10 (ignition OFF). The automated valet parking system 100 holds the information of the parking space 4 of the AVP vehicle 10 in association with the user X.

Exit of the AVP vehicle 10 from the parking lot 1 is as follows. The user X requests the exit of the AVP vehicle 10 by using the terminal device 200. The exit request includes the authentication information, information of the pick-up and drop-off area 2 specified by the user X, and the like. In response to the exit request, the automated valet parking system 100 conducts authentication of the user X and executes exit processing with regard to the AVP vehicle 10.

In the exit processing, the automated valet parking system 100 communicates with the AVP vehicle 10 to activate the AVP vehicle 10 (ignition ON).

Further, the automated valet parking system 100 communicates with the AVP vehicle 10 to provide the AVP vehicle 10 with exit guiding information. The exit guiding information includes information of the pick-up and drop-off area 2 specified by the user X and the map information of the parking lot 1. The automated valet parking system 100 may specify a travel route from the parking space 4 to the specified pick-up and drop-off area 2. In that case, the exit guiding information includes information of the specified travel route.

After that, the automated valet parking system 100 communicates with the AVP vehicle 10 to permit the exit.

Upon receipt of the exit permit, the AVP vehicle 10 initiates the vehicle travel control. More specifically, the AVP vehicle 10 automatically travels on the passage 3 from the parking space 4 to the specified pick-up and drop-off area 2 based on the exit guiding information. At this time, the AVP vehicle 10 may travel along the travel route specified by the automated valet parking system 100. The automated valet parking system 100 may communicate with the AVP vehicle 10 to remotely control the travel of the AVP vehicle 10.

The AVP vehicle 10 arrives and stops at the pick-up and drop-off area 2 specified by the user X. The authority to operate the AVP vehicle 10 is transferred from the automated valet parking system 100 to the user X. The user X (and other occupants if any) gets on the AVP vehicle 10. The AVP vehicle 10 starts moving toward a next destination.

2. AVP Vehicle 2-1. Configuration Example

Figure 2:
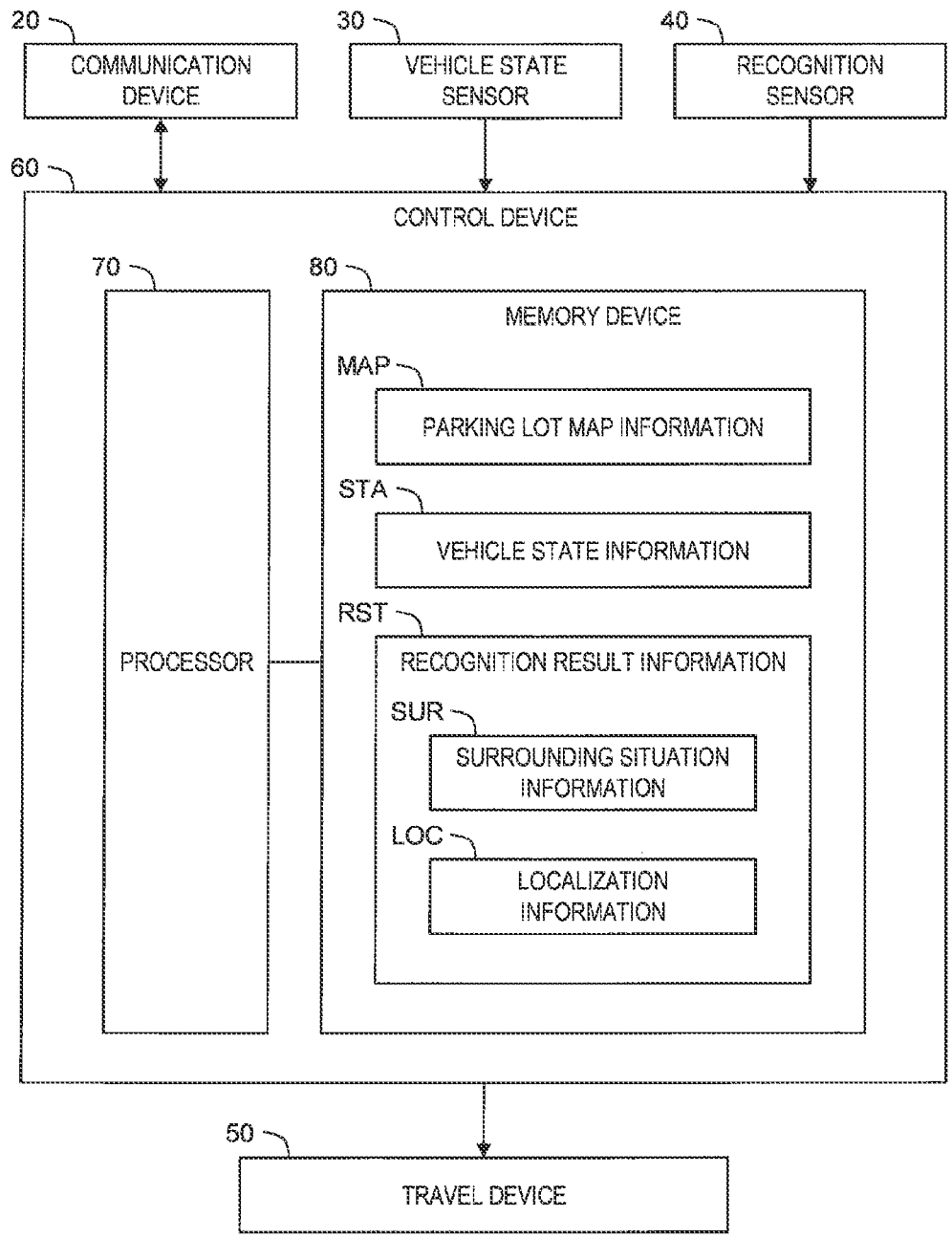
FIG. 2 is a block diagram showing a configuration example of an AVP vehicle according to an embodiment of the present disclosure.

FIG. 2 is a block diagram showing the AVP vehicle 10 according to the present embodiment. The AVP vehicle 10 includes a communication device 20, a vehicle state sensor 30, a recognition sensor 40, a travel device 50, and a control device (controller) 60.

The communication device 20 communicates with the outside of the AVP vehicle 10. For example, the communication device 20 communicates with the automated valet parking system 100.

The vehicle state sensor 30 detects a state of the AVP vehicle 10. Examples of the vehicle state sensor 30 include a vehicle speed sensor, a steering angle sensor, a yaw rate sensor, a lateral acceleration sensor, and the like.

The recognition sensor 40 recognizes (detects) a situation around the AVP vehicle 10. Examples of the recognition sensor 40 include a camera, a LIDAR (Laser Imaging Detection and Ranging, a radar, a sonar, and the like.

The travel device 50 includes a steering device, a driving device, and a braking device. The steering device turns (i.e., changes a direction of) a wheel of the AVP vehicle 10. For example, the steering device includes an electric power steering (EPS) device. The driving device is a power source that generates a driving force. Examples of the driving device include an engine, an electric motor, an in-wheel motor, and the like. The braking device generates a braking force.

The control device (controller) 60 controls the AVP vehicle 10. The control device 60 is also called an electronic control unit (ECU). The control device 60 includes a processor 70 and a memory device 80. The processor 70 executes a variety of processing. The memory device 80 stores a variety of information. Examples of the memory device 80 include a volatile memory, a nonvolatile memory, and the like. The variety of processing by the processor 70 is achieved by the processor 70 executing a control program being a computer program. The control program is stored in the memory device 80 or recorded in a computer-readable recording medium.

2-2. Information Acquisition Processing

The processor 70 (the control device 60) executes "information acquisition processing" that acquires a variety of information. The variety of information includes parking lot map information MAP, vehicle state information STA, surrounding situation information SUR, localization information LOC, and the like. The acquired information is stored in the memory device 80.

The parking lot map information MAP is map information of the parking lot 1. More specifically, the parking lot map information MAP indicates an arrangement of the pick-up and drop-off area 2, the passage 3, the parking spaces 4, and the marks 5 in the parking lot 1. For example, the marks 5 are placed at predetermined positions in the parking lot 1. The parking lot map information MAP indicates the predetermined positions of the marks 5. The parking lot map information MAP is provided by the automated valet parking system 100. The processor 70 acquires the parking lot map information MAP from the automated valet parking system 100 via the communication device 20.

The vehicle state information STA is information indicating the state of the AVP vehicle 10, and indicates a result of detection by the vehicle state sensor 30. Examples of the state of the AVP vehicle 10 include a vehicle speed, a steering angle (a turning angle of a wheel), a yaw rate, a lateral acceleration, and the like. The processor 70 acquires the vehicle state information STA from the vehicle state sensor 30.

The surrounding situation information SUR is information indicating a situation around the AVP vehicle 10, and indicates a result of recognition by the recognition sensor 40. For example, the surrounding situation information SUR includes image information captured by the camera. As another example, the surrounding situation information SUR includes measurement information indicating a result of measurement by the LIDAR and/or the radar. Furthermore, the surrounding situation information SUR includes information (e.g., a position and a relative speed) of an object around the AVP vehicle 10. Examples of the object around the AVP vehicle 10 include the passage 3, the parking space 4, the mark 5, a white line, another vehicle, a structure (e.g., a wall, a pillar), and the like. Based on at least one of the image information and the measurement information, it is possible to recognize the object around the AVP vehicle 10 and calculate a relative position and a relative speed of the recognized object. Further, combining the relative position of the object and a vehicle position described later makes it possible to calculate a position (absolute position) of the object in the parking lot 1. In this manner, the processor 70 is able to acquire (generate) the surrounding situation information SUR based on the result of recognition by the recognition sensor 40.

Moreover, the processor 70 (the control device 60) executes "localization" that estimates a position and an orientation of the AVP vehicle 10 in the parking lot 1. The position and the orientation of the AVP vehicle 10 in the parking lot 1 are hereinafter collectively referred to as a "vehicle position." The processor 70 calculates a movement amount of the AVP vehicle 10 based on the vehicle state information STA (specifically, the vehicle speed and the steering angle), thereby roughly calculating the vehicle position. Further, the processor 70 corrects the vehicle position by comparing the predetermined position of the mark 5 indicated by the parking lot map information MAP with the recognized position of the mark 5 indicated by the surrounding situation information SUR. It is thus possible to estimate (identify) the vehicle position with high accuracy. By repeating the calculation of the movement amount and the correction of the vehicle position, it is possible to continuously acquire the highly accurate vehicle position.

The localization information LOC indicates the vehicle position estimated by the localization. As described above, the localization is executed based on the surrounding situation information SUR, that is, the result of recognition by the recognition sensor 40. That is to say, the localization information LOC is generated based on the result of recognition by the recognition sensor 40, as in the case of the surrounding situation information SUR.

Recognition result information RST is information generated based on the result of recognition by the recognition sensor 40. For example, the recognition result information RST includes at least one of the surrounding situation information SUR and the localization information LOC described above.

2-3. Communication Processing

The processor 70 (the control device 60) executes "communication processing" that communicates with the automated valet parking system 100 through the communication device 20. For example, the processor 70 receives the entry guiding information and the exit guiding information described above from the automated valet parking system 100. In addition, the processor 70 periodically transmits the vehicle state information STA and the recognition result information RST described above to the automated valet parking system 100.

2-4. Vehicle Travel Control

The processor 70 (the control device 60) executes "vehicle travel control" that controls the travel of the AVP vehicle 10 without depending on a driving operation by the driver. The vehicle travel control includes steering control, acceleration control, and deceleration control. The processor 70 executes the vehicle travel control by controlling the travel device 50. More specifically, the processor 70 executes the steering control by controlling the steering device. The processor 70 executes the acceleration control by controlling the driving device. The processor 70 executes the deceleration control by controlling the braking device.

In the parking lot 1, the processor 70 executes the vehicle travel control in order to make the AVP vehicle 10 autonomously travel. More specifically, the processor 70 grasps the map of the parking lot 1 and the vehicle position in the parking lot 1 based on the parking lot map information MAP and the localization information LOC. Then, the processor 70 executes the vehicle travel control so that the AVP vehicle 10 automatically travels to a destination.

For example, in the case of the above-described entry processing, the point of departure is the pick-up and drop-off area 2 and the destination is the allocated parking space 4. The processor 70 executes the vehicle travel control such that the AVP vehicle 10 automatically travels from the pick-up and drop-off area 2 to the allocated parking space 4 and automatically parks in the allocated parking space 4. The position of the allocated parking space 4 is obtained from the parking lot map information MAP. The processor 70 may execute the vehicle travel control such that the AVP vehicle 10 travels along the travel route specified by the automated valet parking system 100. When the AVP vehicle 10 parks in the parking space 4, it is also possible to grasp the parking space 4 and a surrounding parking situation by referring to the surrounding situation information SUR. The vehicle travel control may be executed so as to avoid a collision with another vehicle or a structure by referring to the surrounding situation information SUR.

The same applies to the exit processing. In the case of the exit processing, the point of departure is the allocated parking space 4 and the destination is the pick-up and drop-off area 2. The processor 70 executes the vehicle travel control so that the AVP vehicle 10 automatically travels from the parking space 4 to the pick-up and drop-off area 2 and automatically stops in the pick-up and drop-off area 2.

3. Abnormality of Recognition Sensor

Next, a case where an abnormality occurs in the recognition sensor 40 installed on the AVP vehicle 10 will be considered. Examples of the abnormality of the recognition sensor 40 include dirt and axis misalignment. Such the abnormality of the recognition sensor 40 causes decrease in accuracy of recognition by the recognition sensor 40. For example, when dirt adheres to a lens of the camera, recognition accuracy of the object such as the parking space 4 and the mark 5 decreases. As another example, when the axis misalignment of the recognition sensor 40 occurs, position calculation accuracy of the object such as the parking space 4 and the mark 5 decreases. These lead to decrease in accuracy of the surrounding situation information SUR.

As described above, the localization is executed based on the recognized position of the mark 5 indicated by the surrounding situation information SUR. Therefore, the decrease in accuracy of the surrounding situation information SUR leads to decrease in accuracy of the localization, that is, decrease in accuracy of the localization information LOC.

Moreover, as described above, the vehicle travel control in the parking lot 1 is executed based on the localization information LOC and the surrounding situation information SUR. Therefore, the decrease in accuracy of the localization information LOC and the surrounding situation information SUR leads to decrease in accuracy of the vehicle travel control in the parking lot 1. Even outside the parking lot 1, the result of recognition by the recognition sensor 40 may be used for the vehicle travel control. In any case, the abnormality of the recognition sensor 40 causes the decrease in accuracy of the vehicle travel control of the AVP vehicle 10.

As described above, the abnormality of the recognition sensor 40 of the AVP vehicle 10 leads to the decrease in accuracy of the recognition result information RST generated based on the result of recognition by the recognition sensor 40. The decrease in accuracy of the recognition result information RST leads to the decrease in accuracy of the vehicle travel control. Therefore, it is desirable to detect the abnormality of the recognition sensor 40.

4. Information Providing Service 4-1. Overview

The automated valet parking system 100 according to the present embodiment detects an abnormality of the recognition sensor 40 of the AVP vehicle 10 and notifies the user X of the AVP vehicle 10 of the abnormality occurrence. Such the service of detecting the abnormality of the recognition sensor 40 of the AVP vehicle 10 and notifying the user X of the abnormality occurrence is hereinafter referred to as an "information providing service." The information providing service is a part of the automated valet parking service. Hereinafter, the information providing service according to the present embodiment will be described.

Figure 3:
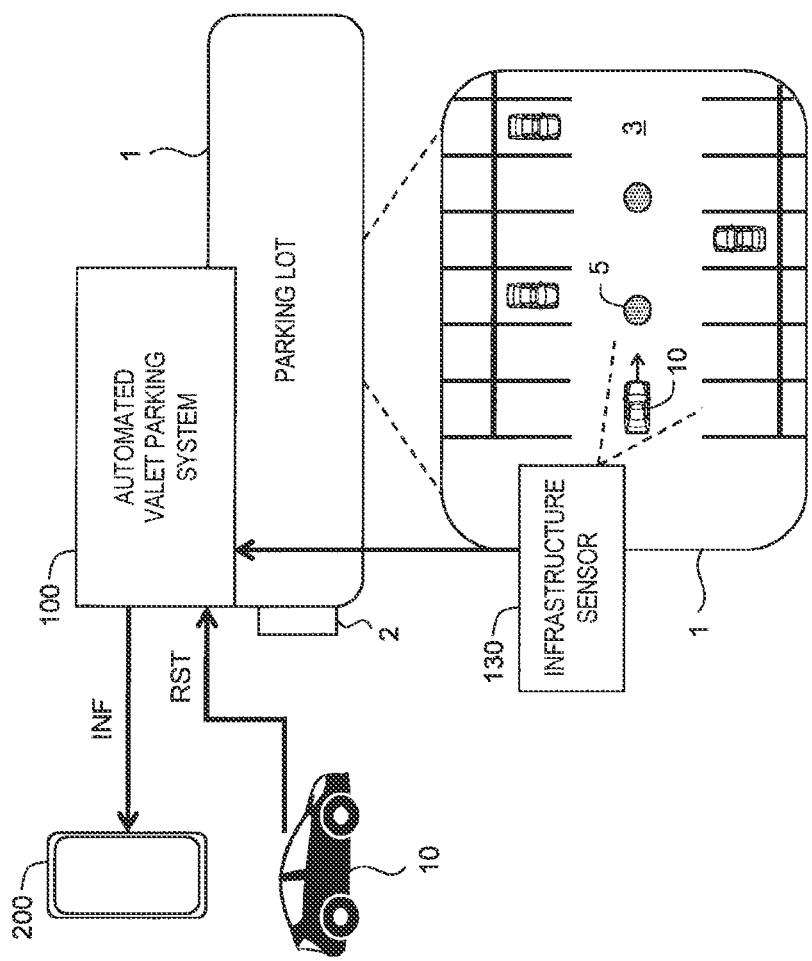
FIG. 3 is a conceptual diagram for explaining an outline of an information providing service according to an embodiment of the present disclosure.

FIG. 3 is a conceptual diagram for explaining an outline of the information providing service according to the present embodiment. The AVP vehicle 10 exists in the parking lot 1. For example, the AVP vehicle 10 is traveling in the parking lot 1 for the entry processing. The AVP vehicle 10 (i.e., the processor 70) generates the recognition result information RST based on the result of recognition by the recognition sensor 40. Then, the AVP vehicle 10 transmits the recognition result information RST to the automated valet parking system 100. The automated valet parking system 100 receives the recognition result information RST from the AVP vehicle 10.

Meanwhile, the automated valet parking system 100 identifies a vehicle position that is a position of the AVP vehicle 10 in the parking lot 1. More specifically, the automated valet parking system 100 includes an infrastructure sensor 130 installed in the parking lot 1. The infrastructure sensor 130 recognizes a situation in the parking lot 1. For example, the infrastructure sensor 130 includes a camera. The infrastructure sensor 130 may include a LIDAR. Based on a result of recognition by the infrastructure sensor 130, the automated valet parking system 100 is able to identify the AVP vehicle 10 existing in the parking lot 1 and further identify the vehicle position of the AVP vehicle 10.

Subsequently, the automated valet parking system 100 acquires another recognition result information RST that is expected to be obtained at the identified vehicle position. Such the recognition result information RST expected to be obtained at the identified vehicle position is hereinafter referred to as "expected recognition result information ERST."

Ideally, the recognition result information RST and the expected recognition result information ERST are consistent with each other. However, if the abnormality of the recognition sensor 40 occurs, the accuracy of the recognition result information RST decreases, and thus the recognition result information RST deviates from the expected recognition result information ERST. Therefore, the automated valet parking system 100 is able to detect the abnormality of the recognition sensor 40 by comparing the recognition result information RST with the expected recognition result information ERST.

When detecting the abnormality of the recognition sensor 40, the automated valet parking system 100 transmits notification information INF for notifying the abnormality of the recognition sensor 40 to the terminal device 200. The terminal device 200 notifies the user X of the notification information INF. For example, the terminal device 200 includes a display device and displays the notification information INF on the display device. The user X is able to know the abnormality of the recognition sensor 40 of the AVP vehicle 10 through the notification information INF.

Hereinafter, processing related to the information providing service by the automated valet parking system 100 will be described in more detail.

4-2. Processing by Automated Valet Parking System

Figure 4:
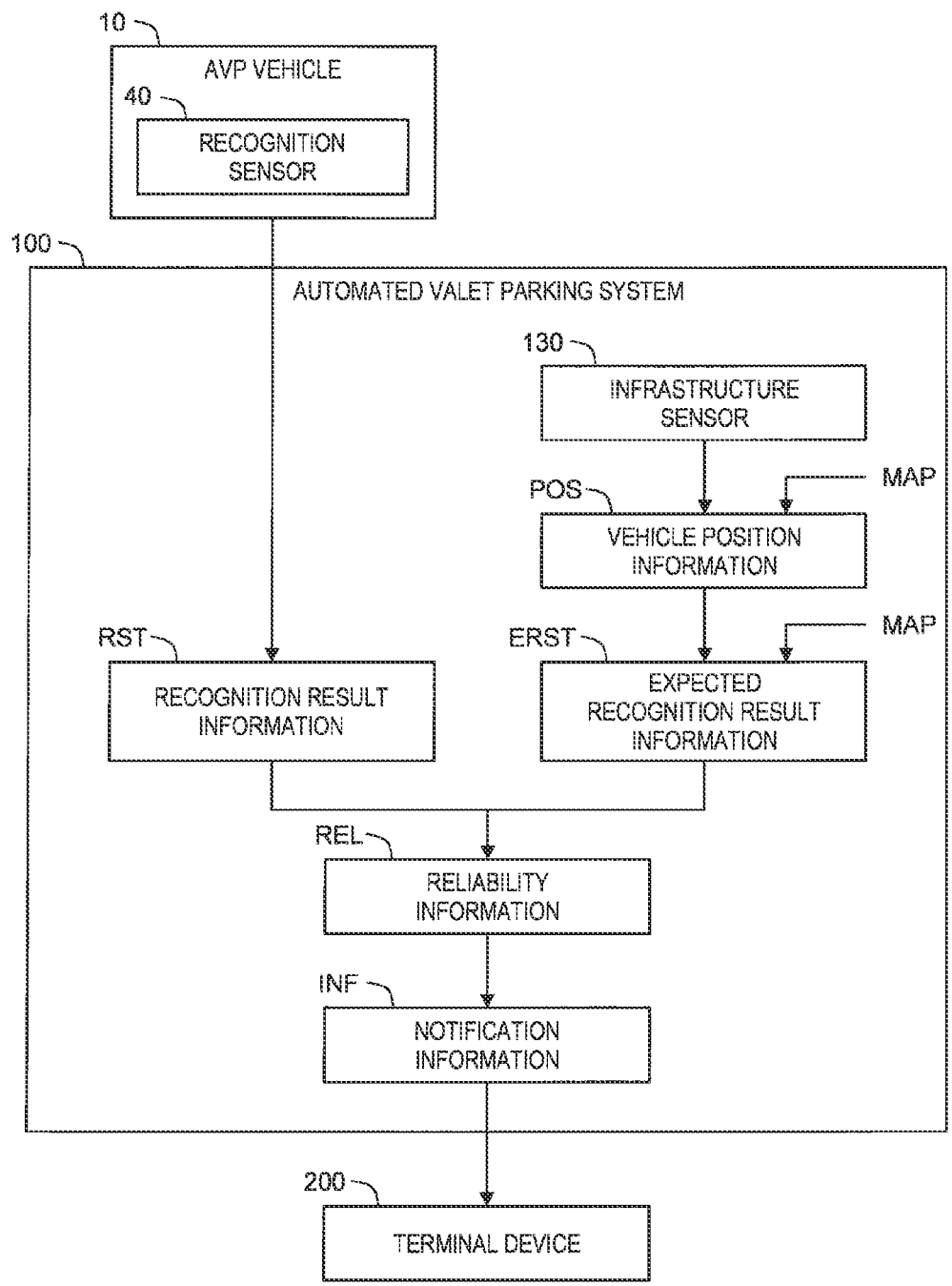
FIG. 4 is a block diagram schematically showing processing related to the information providing service by the automated valet parking system according to an embodiment of the present disclosure.
Figure 5:
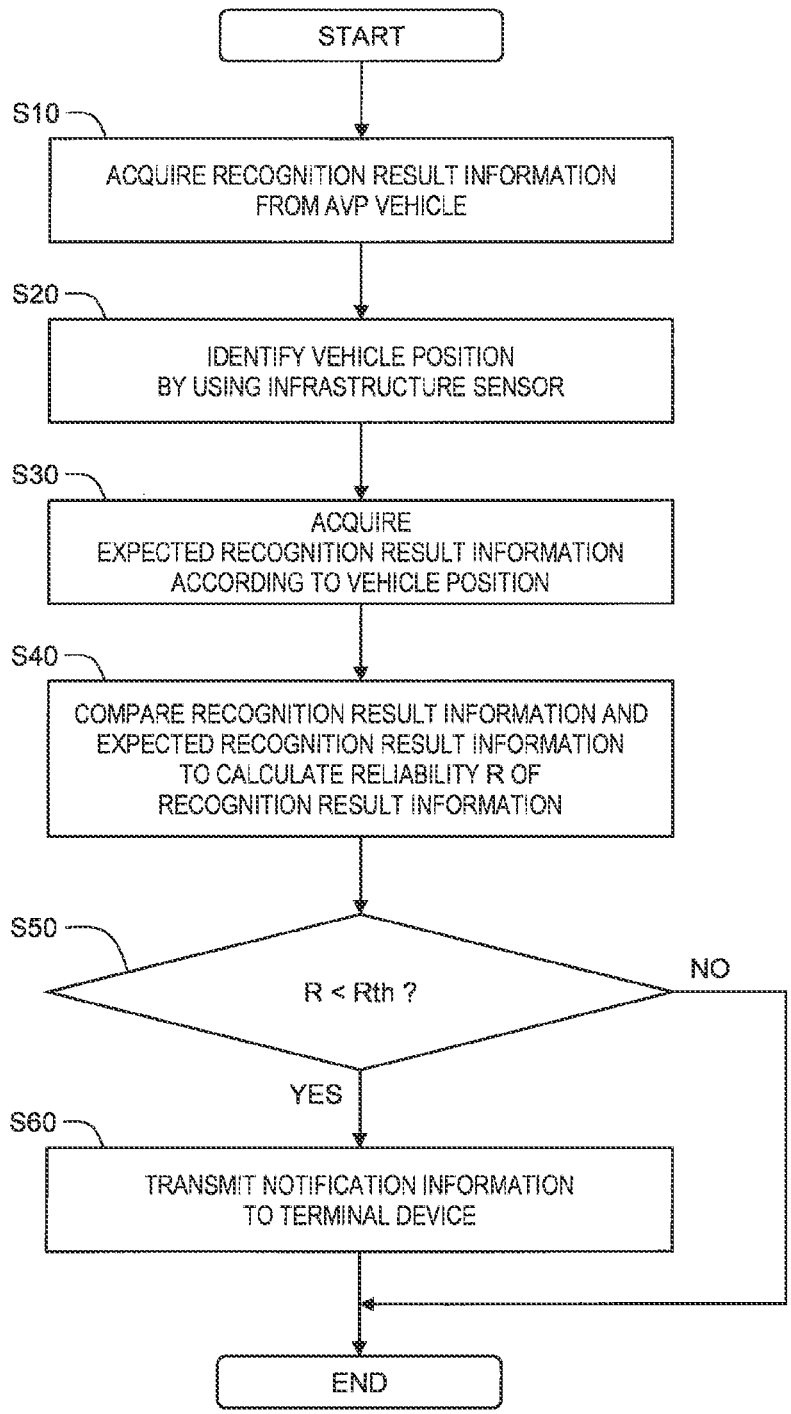
FIG. 5 is a flow chart showing processing related to the information providing service by the automated valet parking system according to an embodiment of the present disclosure.

FIGS. 4 and 5 are a block diagram and a flow chart showing processing related to the information providing service by the automated valet parking system 100 according to the present embodiment, respectively.

4-2-1. Step S10

The automated valet parking system 100 acquires the recognition result information RST from the AVP vehicle 10. The recognition result information RST is generated based on the result of recognition by the recognition sensor 40 when the AVP vehicle 10 exists in the parking lot 1.

In a first example, the recognition result information RST includes the localization information LOC. As described above, the localization information LOC indicates the vehicle position estimated based on the result of recognition by the recognition sensor 40.

In a second example, the recognition result information RST includes the surrounding situation information SUR indicating a position (relative position or absolute position) of a mark 5. As described above, the relative position of the mark 5 with respect to the AVP vehicle 10 is calculated based on the result of recognition by the recognition sensor 40. The absolute position of the mark 5 in the parking lot 1 is calculated by combining the relative position of the mark 5 and the vehicle position indicated by the localization information LOC.

4-2-2. Step S20

The automated valet parking system 100 identifies the vehicle position that is the position of the AVP vehicle 10 in the parking lot 1. Here, the above-described infrastructure sensor 130 that recognizes the situation in the parking lot 1 is used. Based on the result of recognition by the infrastructure sensor 130, the automated valet parking system 100 identifies the AVP vehicle 10 in the parking lot 1 and identifies the vehicle position of the AVP vehicle 10. More specifically, sensor installation information indicating an installation position and a direction of a field of view of the infrastructure sensor 130 in the parking lot 1 is prepared in advance. The vehicle position can be identified by combining the sensor installation information, the parking lot map information MAP, and the result of recognition by the infrastructure sensor 130. Vehicle position information POS indicates the identified vehicle position.

It should be noted that the AVP vehicle 10 of the user X is distinguished from other vehicles based on, for example, the vehicle license number. For example, when the infrastructure sensor 130 includes a camera, the camera recognizes the vehicle license number of each vehicle. By referring to the vehicle license number of the AVP vehicle 10 of the user X that is registered in advance, it is possible to distinguish the AVP vehicle 10 of the user X from other vehicles.

4-2-3. Step S30

The automated valet parking system 100 acquires the expected recognition result information ERST according to the vehicle position indicated by the vehicle position information POS. The expected recognition result information ERST is the recognition result information RST expected to be obtained at the vehicle position.

In the case of the first example described above, the recognition result information RST includes the localization information LOC indicating the vehicle position estimated based on the result of recognition by the recognition sensor 40. In this case, the expected recognition result information ERST is the vehicle position information POS itself indicating the vehicle position identified in Step S20. The automated valet parking system 100 acquires the vehicle position information POS as the expected recognition result information ERST.

In the case of the second example described above, the recognition result information RST indicates the position of the mark 5 calculated based on the result of recognition by the recognition sensor 40. In this case, the expected recognition result information ERST indicates the predetermined position at which the mark 5 is placed. The parking lot map information MAP indicates predetermined positions at which marks 5 are placed in the parking lot 1. The vehicle position information POS indicates the vehicle position of the AVP vehicle 10 in the parking lot 1. Based on the parking lot map information MAP and the vehicle position information POS, the automated valet parking system 100 identifies the mark 5 expected to be recognized by the recognition sensor 40 of the AVP vehicle 10 existing at the vehicle position. Then, based on the parking lot map information MAP, the automated valet parking system 100 acquires information indicating the predetermined position of the identified mark 5 as expected recognition result information ERST.

4-2-4. Step S40

The automated valet parking system 100 compares the recognition result information RST with the expected recognition result information ERST. Then, the automated valet parking system 100 calculates reliability R of the recognition result information RST based on a difference between the recognition result information RST and the expected recognition result information ERST. Typically, the reliability R becomes lower as the difference between the recognition result information RST and the expected recognition result information ERST becomes larger. Reliability information REL indicates the calculated reliability R of the recognition result information RST.

In the case of the first example described above, the automated valet parking system 100 compares the vehicle position indicated by the recognition result information RST with the vehicle position indicated by the expected recognition result information ERST. The automated valet parking system 100 calculates the reliability R to be lower as a difference between the two vehicle positions becomes larger. Alternatively, the automated valet parking system 100 may count the number of times the difference exceeds a predetermined threshold and calculate the reliability R to be lower as the number of times increases.

In the case of the second example described above, the automated valet parking system 100 compares the calculated position of the mark 5 indicated by the recognition result information RST with the predetermined position of the mark 5 indicated by the expected recognition result information ERST. The automated valet parking system 100 calculates the reliability R to be lower as a difference between the two mark positions becomes larger. Alternatively, the automated valet parking system 100 may count the number of times the difference exceeds a predetermined threshold and calculate the reliability R to be lower as the number of times increases.

4-2-5. Step S50

The automated valet parking system 100 compares the reliability R indicated by the reliability information REL with a reliability threshold Rth. When the reliability R is equal to or higher than the reliability threshold Rth (Step S50; No), the processing ends. On the other hand, when the reliability R is lower than the reliability threshold Rth (Step S50; Yes), the automated valet parking system 100 determines that an abnormality has occurred in the recognition sensor 40. In this case, the processing proceeds to Step S60.

4-2-6. Step S60

The automated valet parking system 100 transmits the notification information INF to the terminal device 200. The notification information INF is information for notifying at least the abnormality of the recognition sensor 40. The user X of the AVP vehicle 10 is able to know the abnormality of the recognition sensor 40 of the AVP vehicle 10 through the notification information INF.

4-3. Effects

As described above, according to the present embodiment, it is possible to detect an abnormality of the recognition sensor 40 of the AVP vehicle 10 supporting the automated valet parking service. More specifically, the recognition result information RST generated based on the result of recognition by the recognition sensor 40 when the AVP vehicle 10 exists in the parking lot 1 is acquired. Meanwhile, by using the infrastructure sensor 130 installed in the parking lot 1, the vehicle position in the parking lot 1 is identified, and the expected recognition result information ERST expected to be obtained at the vehicle position is acquired. Ideally, the recognition result information RST and the expected recognition result information ERST are consistent with each other. However, if an abnormality of the recognition sensor 40 occurs, the accuracy of the recognition result information RST decreases, and thus the recognition result information RST deviates from the expected recognition result information ERST. Therefore, comparing the recognition result information RST with the expected recognition result information ERST makes it possible to detect the abnormality of the recognition sensor 40.

When the abnormality of the recognition sensor 40 of the AVP vehicle 10 is detected, the notification information INF for notifying the abnormality of the recognition sensor 40 is transmitted to the terminal device 200. The user X of the AVP vehicle 10 is able to know the abnormality of the recognition sensor 40 through the notification information INF. Such the information providing service is performed as a part of the automated valet parking service and contributes to increase in convenience and usefulness of the automated valet parking service.

The user X who receives the notification information INF can consider cleaning, inspection, or repair of the recognition sensor 40. When the abnormality of the recognition sensor 40 is resolved, the accuracy of recognition by the recognition sensor 40 makes a recovery. As a result, the accuracy of the localization executed based on the result of recognition by the recognition sensor 40 also makes a recovery. Furthermore, the accuracy of the vehicle travel control executed based on the result of recognition by the recognition sensor 40 also makes a recovery. These are suitable for the automated valet parking service that requires precise vehicle travel control.

It should be noted that it is common that the AVP vehicle 10 existing in the parking lot 1 transmits the recognition result information RST to the automated valet parking system 100. It is also common that the infrastructure sensor 130 is installed in the parking lot 1. It can be said that the information providing service according to the present embodiment is realized by effectively utilizing existing information and equipment. This is advantageous in terms of costs.

5. Additional Service

It is also conceivable to provide an "additional service" other than the parking service to the AVP vehicle 10 by effectively utilizing a period in which the AVP vehicle 10 is left in the parking lot 1 (that is, a period in which no occupant is on the AVP vehicle 10). Examples of the additional service include car wash, inspection, repair, refueling, charging, tire change, and the like of the AVP vehicle 10. Such the additional service also is a part of the automated valet parking service.

Figure 6:
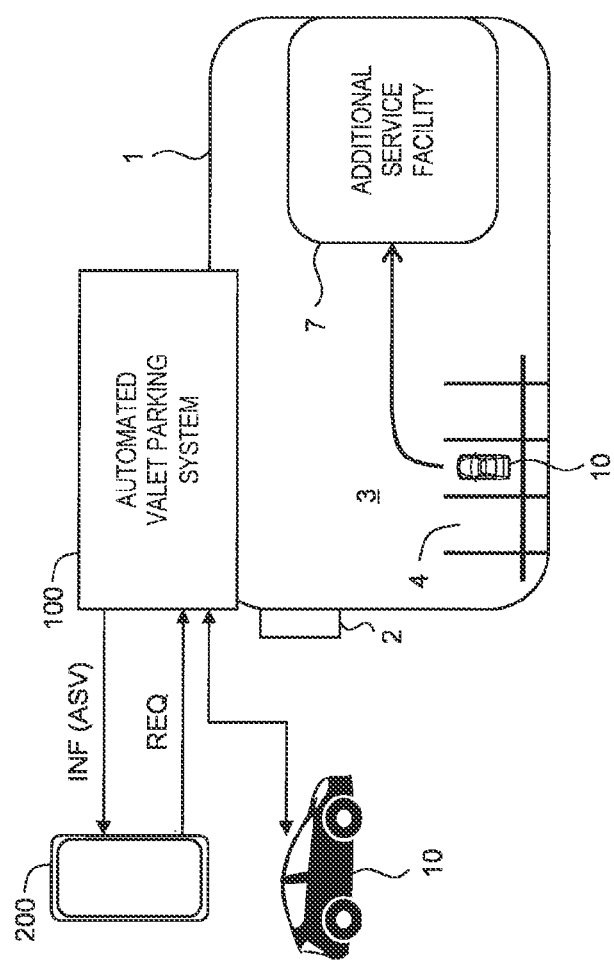
FIG. 6 is a conceptual diagram for explaining an additional service according to an embodiment of the present disclosure.

FIG. 6 is a conceptual diagram for explaining the additional service according to the present embodiment. An additional service facility 7 is a facility for performing the additional service with respect to the AVP vehicle 10. The additional service facility 7 is located within the parking lot 1 or is affiliated with the parking lot 1.

As described above, when the reliability R of the recognition result information RST is lower than the reliability threshold Rth, the automated valet parking system 100 transmits the notification information INF to the terminal device 200. The notification information INF may include "additional service information ASV" that proposes to perform the additional service during a period in which the AVP vehicle 10 is left in the parking lot 1. The additional service here is for resolving the abnormality (e.g., dirt, axis misalignment) of the recognition sensor 40, and includes at least one of car wash, inspection, and repair of the AVP vehicle 10. In other words, the additional service information ASV proposes to perform the additional service including at least one of car wash, inspection, and repair.

The user X of the AVP vehicle 10 knows the presence of the additional service through the additional service information ASV. Therefore, the user X can consider using the additional service in order to resolve the abnormality of the recognition sensor 40. The additional service information ASV may indicate at least one of a time of day in which the additional service is available, a waiting time for the additional service to be available, and an expected time required for performing the additional service. These pieces of information are useful for the user X to consider whether or not to use the additional service.

When determining to use the additional service, the user X operates the terminal device 200 to send an additional service request REQ to the automated valet parking system 100. The additional service request REQ is information for requesting use of the additional service.

Figure 7:
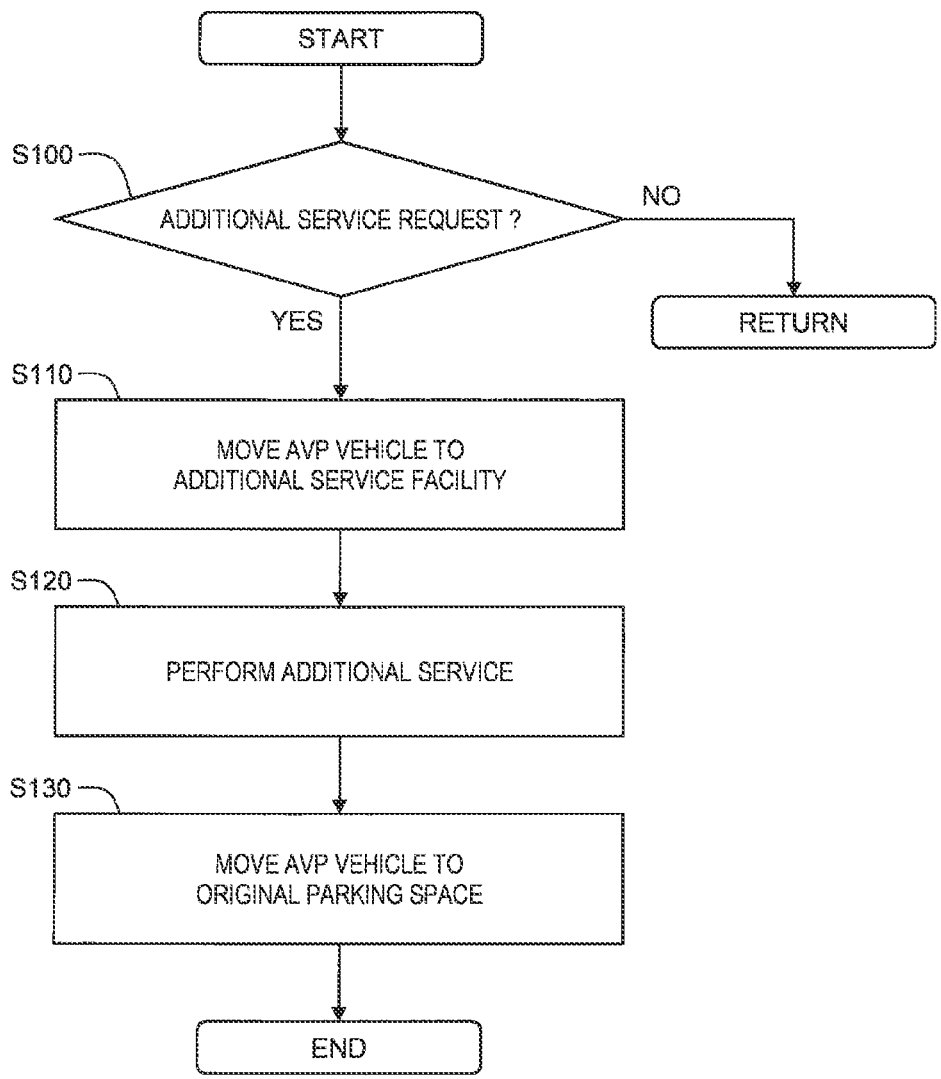
FIG. 7 is a flow chart showing processing related to an additional service according to an embodiment of the present disclosure.

FIG. 7 is a flow chart showing processing related to the additional service according to the present embodiment.

In Step S100, the automated valet parking system 100 determines whether or not it receives the additional service request REQ from the terminal device 200. When the automated valet parking system 100 receives the additional service request REQ (Step S100; Yes), the processing proceeds to Step S110.

In Step S110, the automated valet parking system 100 performs move processing that moves the AVP vehicle 10 to the additional service facility 7 (see FIG. 6). The move processing is performed in the same manner as the entry processing and the exit processing. The point of departure is the parking space 4 in which the AVP vehicle 10 is parked, and the destination is the additional service facility 7. The automated valet parking system 100 specifies the destination and instructs the AVP vehicle 10 to move to the destination.

The AVP vehicle 10 (i.e., the processor 70) executes the vehicle travel control such that the AVP vehicle 10 automatically travels from the parking space 4 to the additional service facility 7. After that, the processing proceeds to Step S120.

In Step S120, the automated valet parking system 100 instructs an operator to perform the additional service. The operator performs the additional service with respect to the AVP vehicle 10. When the additional service is completed, the operator notifies the automated valet parking system 100 of the service completion. After that, the processing proceeds to Step S130.

In Step S130, the automated valet parking system 100 performs move processing that moves the AVP vehicle 10 to the original parking space 4. The move processing is performed in the same manner as the entry processing and the exit processing. The point of departure is the additional service facility 7, and the destination is the original parking space 4. The automated valet parking system 100 specifies the destination and instructs the AVP vehicle 10 to move to the destination. The AVP vehicle 10 (i.e., the processor 70) executes the vehicle travel control such that the AVP vehicle 10 automatically travels from the additional service facility 7 to the parking space 4 and automatically parks in the parking space 4. The automated valet parking system 100 may transmit information indicating the completion of the additional service to the terminal device 200.

As described above, when the automated valet parking service includes the additional service, the automated valet parking system 100 can transmit the notification information INF including the additional service information ASV to the terminal device 200. In other words, the automated valet parking system 100 is able to actively suggest the use of the additional service to the user X. As a result, increase in opportunity of usage of the additional service is expected. This is preferable for a service provider. Moreover, when the additional service is used, the convenience and the usefulness of the automated valet parking service are further increased.

Figure 8:
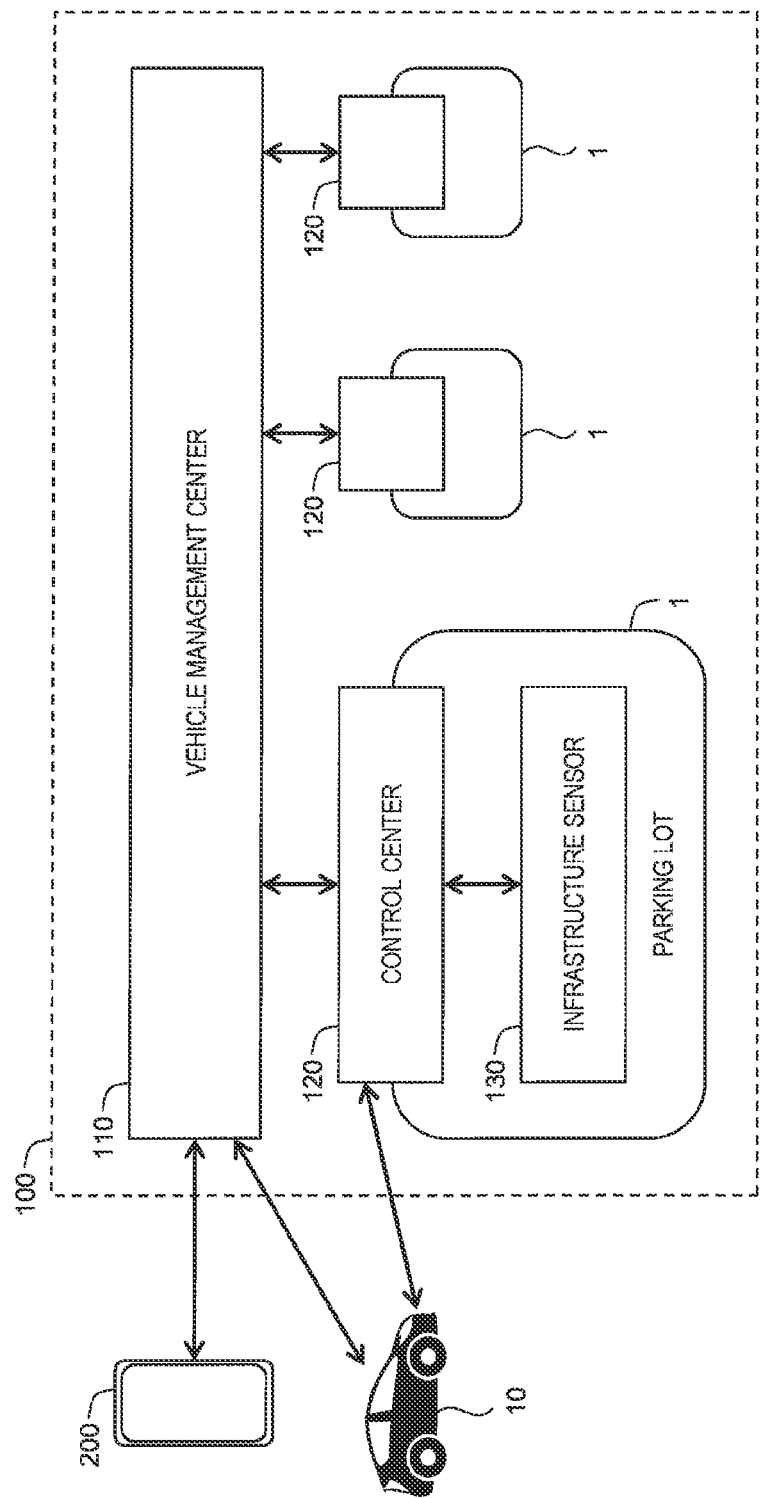
FIG. 8 is a schematic diagram showing a configuration example of the automated valet parking system according to an embodiment of the present disclosure.

6. Concrete Example of Automated Valet Parking System
6-1. Configuration Example FIG. 8 is a schematic diagram showing a configuration example of the automated valet parking system 100 according to the present embodiment. The automated valet parking system 100 includes a vehicle management center 110, a control center 120, and the infrastructure sensor 130. The control center 120 is placed for each parking lot 1. Therefore, there are as many control centers 120 as the parking lots 1. The vehicle management center 110 controls all the control centers 120.

Figure 9:
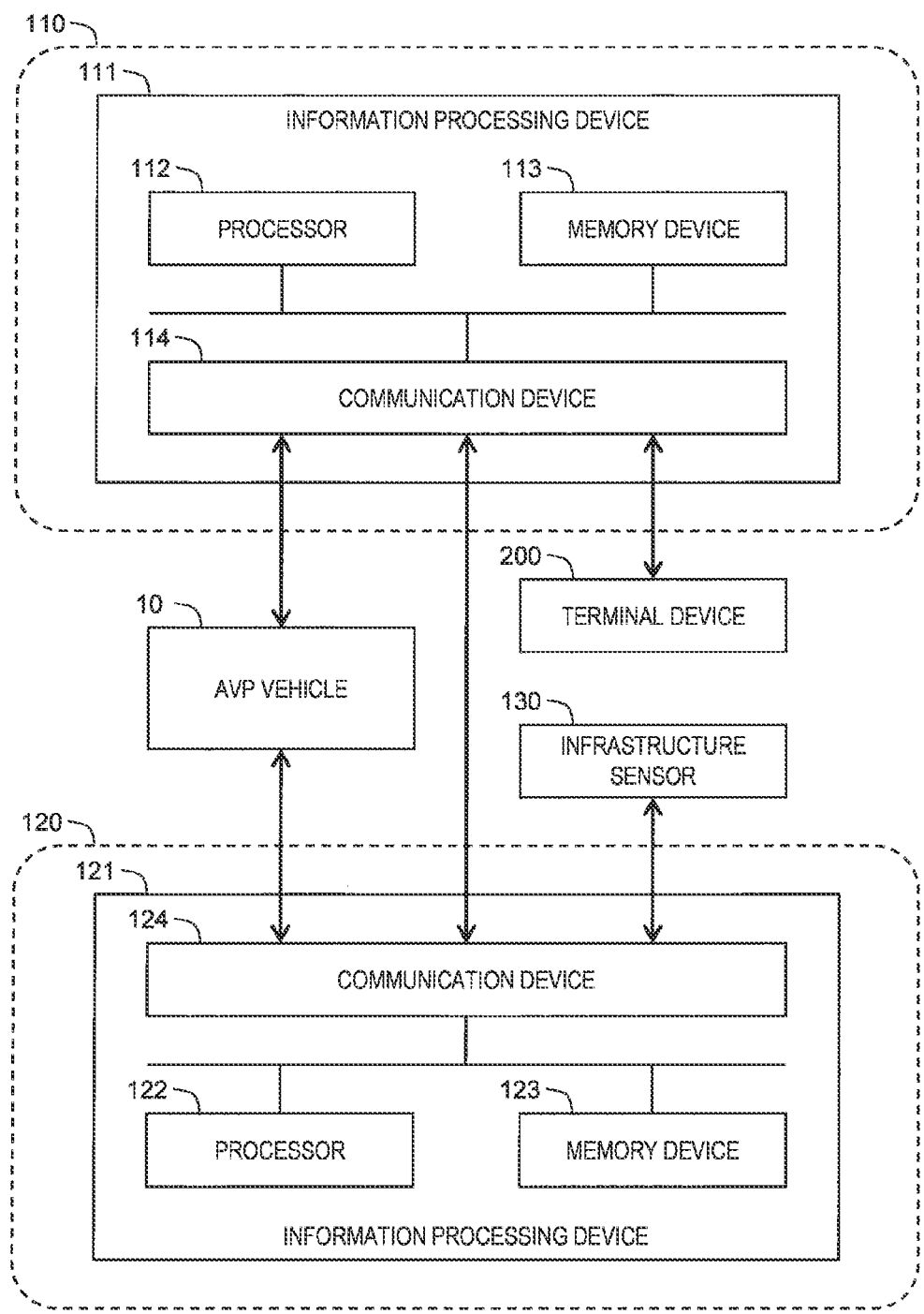
FIG. 9 is a block diagram showing a configuration example of the automated valet parking system according to an embodiment of the present disclosure.

FIG. 9 is a block diagram showing a concrete configuration example of the automated valet parking system 100 according to the present embodiment.

The vehicle management center 110 includes an information processing device 111 (a vehicle management server). The information processing device 111 includes a processor 112, a memory device 113, and a communication device 114. The memory device 113 stores a variety of of information. Examples of the memory device 113 include a volatile memory, a nonvolatile memory, an HDD, and the like. The processor 112 executes a variety of information processing by executing a computer program stored in the memory device 113. The communication device 114 communicates with the control center 120, the AVP vehicle 10, and the terminal device 200.

The control center 120 includes an information processing device 121 (a control device). The information processing device 121 includes a processor 122, a memory device 123, and a communication device 124. The memory device 123 stores a variety of information. Examples of the memory device 123 include a volatile memory, a nonvolatile memory, an HDD, and the like. The processor 122 executes a variety of information processing by executing a computer program stored in the memory device 123. The communication device 124 communicates with the vehicle management center 110, the AVP vehicle 10, and the infrastructure sensor 130.

The processing by the automated valet parking system 100 according to the present embodiment is executed by at least one of the processor 112 of the vehicle management center 110 and the processor 122 of the control center 120. That is, the processing by the automated valet parking system 100 according to the present embodiment is executed by one or more processors (112, 122). Information necessary for the processing is stored in at least one of the memory device 113 of the vehicle management center 110 and the memory device 123 of the control center 120. That is, the information necessary for the processing is stored in one or more memory devices (113, 123).

6-2. Parking Lot Map Information

The parking lot map information MAP is stored in advance in the memory device 123 of the control center 120. The processor 122 of the control center 120 transmits the parking lot map information MAP to the AVP vehicle 10 via the communication device 124.

6-3. Processing Related to Information Providing Service

The one or more processors (112, 122) of the automated valet parking system 100 execute the processing related to the information providing service showing in FIGS. 4 and 5.

In Step S10, the processor 122 of the control center 120 acquires the recognition result information RST from the AVP vehicle 10 via the communication device 124. The recognition result information RST is stored in the memory device 123.

In Step S20, the processor 122 of the control center 120 identifies the vehicle position. More specifically, the processor 122 communicates with the infrastructure sensor 130 via the communication device 124 and acquires information indicating the result of recognition by the infrastructure sensor 130. The sensor installation information indicating the installation position and the direction of the field of view of the infrastructure sensor 130 in the parking lot 1 is stored in advance in the memory device 123. The processor 122 identifies the vehicle position based on the sensor installation information, the parking lot map information MAP, and the result of recognition by the infrastructure sensor 130. The vehicle position information POS indicating the identified vehicle position is stored in the memory device 123.

In Step S30, the processor 122 of the control center 120 acquires the expected recognition result information ERST according to the vehicle position indicated by the vehicle position information POS. The expected recognition result information ERST is stored in the memory device 123.

In Step S40, the processor 122 of the control center 120 compares the recognition result information RST with the expected recognition result information REST to calculate the reliability R of the recognition result information RST. The reliability information REL indicating the calculated reliability R is stored in the memory device 123.

In Step S50, the processor 122 of the control center 120 compares the reliability R indicated by the reliability information REL with the reliability threshold Rth. When the reliability R is lower than the reliability threshold Rth (Step S50; Yes), the processing proceeds to Step S60.

In Step S60, the processor 122 of the control center 120 generates the notification information INF and stores the notification information INF in the memory device 113. The notification information INF may include the additional service information ASV. An operation status of the additional service facility 7 is managed by the control center 120. The processor 122 transmits a notification information transmission request to the vehicle management center 110 via the communication device 124. The notification information transmission request includes the notification information INF. The processor 112 of the vehicle management center 110 receives the notification information transmission request from the control center 120 via the communication device 114. Then, the processor 112 transmits the notification information INF to the terminal device 200 via the communication device 114.

As a modification example, the notification information INF may be generated by the vehicle management center 110. More specifically, the processor 122 of the control center 120 transmits a notification information transmission request to the vehicle management center 110 via the communication device 124. The notification information transmission request includes information necessary for generating the notification information INF. In response to the notification information transmission request, the processor 112 of the vehicle management center 110 generates the notification information INF and stores the notification information INF in the memory device 113. Further, the processor 112 transmits the notification information INF to the terminal device 200 via the communication device 114.

As another modification example, Steps S50 and S60 may be executed by the vehicle management center 110. More specifically, the processor 122 of the control center 120 transmits the reliability information REL to the vehicle management center 110 via the communication device 124. The processor 112 of the vehicle management center 110 receives the reliability information REL from the control center 120 via the communication device 114. The reliability information REL is stored in the memory device 113. Then, the processor 112 executes Step S50 and Step S60.

As still another modification example, Steps S40 to S60 may be executed by the vehicle management center 110. More specifically, the processor 122 of the control center 120 transmits the recognition result information RST and the expected recognition result information ERST to the vehicle management center 110 via the communication device 124. The processor 112 of the vehicle management center 110 receives the recognition result information RST and the expected recognition result information ERST from the control center 120 via the communication device 114. The recognition result information RST and the expected recognition result information ERST are stored in the memory device 113. Then, the processor 112 executes Steps S40 to S60.

6-4. Processing Related to Additional Service

The one or more processors (112, 122) of the automated valet parking system 100 execute the processing related to the additional service shown in FIG. 7.

In Step S100, the processor 112 of the vehicle management center 110 receives the additional service request REQ from the terminal device 200 via the communication device 114. In response to the additional service request REQ, the processing proceeds to Step S110.

In Step S110, the processor 112 communicates with the AVP vehicle 10 via the communication device 114 to activate the AVP vehicle 10 (ignition ON). Further, the processor 112 communicates with the control center 120 via the communication device 114 and instructs the control center 120 to execute the move processing. The processor 122 of the control center 120 transmits move processing instruction information to the AVP vehicle 10 via the communication device 124. The move processing instruction information indicates the additional service facility 7 being the destination. In response to the move processing instruction information, the AVP vehicle 10 automatically travels from the parking space 4 to the additional service facility 7.

When arriving at the destination (i.e., the additional service facility 7), the AVP vehicle 10 transmits an arrival notification to the control center 120. The processor 122 of the control center 120 receives the arrival notification from the AVP vehicle 10 via the communication device 124. The processor 122 transfers the arrival notification to the vehicle management center 110 via the communication device 124. The processor 112 of the vehicle management center 110 receives the arrival notification from the control center 120 via the communication device 114. Then, the processor 112 communicates with the AVP vehicle 10 via the communication device 114 to deactivate the AVP vehicle 10 (ignition OFF).

Step S130 is similar to Step S110. However, the destination is the original parking space 4.

What is claimed is:

1. An automated valet parking system that provides an automated valet parking service in a parking lot, wherein a vehicle supporting the automated valet parking service comprises a recognition sensor that recognizes a situation around the vehicle, the automated valet parking system comprising:
one or more processors; and
one or more memories configured to store recognition result information generated based on a result of recognition by the recognition sensor when the vehicle exists in the parking lot, wherein
the one or more processors are configured to:
identify a vehicle position being a position of the vehicle in the parking lot, based on a result of recognition by an infrastructure sensor installed in the parking lot;
acquire expected recognition result information that is the recognition result information expected to be obtained at the vehicle position;
compare the recognition result information with the expected recognition result information to calculate reliability of the recognition result information based on a difference between the recognition result information and the expected recognition result information; and
when the reliability is lower than a threshold, transmit notification information for notifying an abnormality of the recognition sensor to a terminal device operated by a user of the vehicle.

2. The automated valet parking system according to claim 1, wherein
the automated valet parking service includes an additional service that performs at least one of car wash, inspection, and repair during a period in which the vehicle is left in the parking lot, and
the notification information includes additional service information that proposes to perform the additional service.

3. The automated valet parking system according to claim 1, wherein
the recognition result information indicates the vehicle position estimated based on the result of recognition by the recognition sensor, and
the one or more processors acquire, as the expected recognition result information, information indicating the vehicle position identified based on the result of recognition by the infrastructure sensor.

4. The automated valet parking system according to claim 3, wherein
the one or more processors calculate the reliability to be lower as a difference between the vehicle position indicated by the recognition result information and the vehicle position indicated by the expected recognition result information becomes larger.

5. The automated valet parking system according to claim 1, wherein
a mark is placed at a predetermined position in the parking lot,
the recognition result information indicates a position of the mark calculated based on the result of recognition by the recognition sensor,
the one or more memories further store parking lot map information indicating an arrangement of marks in the parking lot, and
the one or more processors identify, based on the parking lot map information, the mark expected to be recognized by the recognition sensor of the vehicle existing at the vehicle position and acquire information indicating the predetermined position of the identified mark as the expected recognition result information.

6. The automated valet parking system according to claim 5, wherein
the one or more processors calculate the reliability to be lower as a difference between the calculated position of the mark indicated by the recognition result information and the predetermined position of the identified mark indicated by the expected recognition result information becomes larger.

7. A service providing method that provides an automated valet parking service in a parking lot, wherein a vehicle supporting the automated valet parking service comprises a recognition sensor that recognizes a situation around the vehicle,
the service providing method comprising:
acquiring recognition result information generated based on a result of recognition by the recognition sensor when the vehicle exists in the parking lot,
identifying a vehicle position being a position of the vehicle in the parking lot, based on a result of recognition by an infrastructure sensor installed in the parking lot;
acquiring expected recognition result information that is the recognition result information expected to be obtained at the vehicle position;
comparing the recognition result information with the expected recognition result information to calculate reliability of the recognition result information based on a difference between the recognition result information and the expected recognition result information; and
when the reliability is lower than a threshold, transmitting notification information for notifying an abnormality of the recognition sensor to a terminal device operated by a user of the vehicle.

8. The service providing method according to claim 7, wherein
the automated valet parking service includes an additional service that performs at least one of car wash, inspection, and repair during a period in which the vehicle is left in the parking lot, and
the notification information includes additional service information that proposes to perform the additional service.

* * * * *